(12) United States Patent
Turtschy et al.

(10) Patent No.: US 8,273,455 B2
(45) Date of Patent: Sep. 25, 2012

(54) METHOD FOR THE PREPARATION OF A GRANULATE FOR THE TREATMENT OF SNOW-COVERED AND/OR ICY SURFACES

(75) Inventors: Jean-Claude Turtschy, La Chaux-de-Fonds (CH); Joseph Mucaria, La Chaux-de-Fonds (CH)

(73) Assignee: Ville de la Chaux-de-Fonds, La Chaux-de-Fonds (CH)

( * ) Notice: Subject to any disclaimer, the term of this patent is extended or adjusted under 35 U.S.C. 154(b) by 93 days.

(21) Appl. No.: 12/715,901

(22) Filed: Mar. 2, 2010

(65) Prior Publication Data

US 2010/0227168 A1 Sep. 9, 2010

(30) Foreign Application Priority Data

Mar. 3, 2009 (CA) ..................................... 2655900

(51) Int. Cl.
*B32B 5/66* (2006.01)
(52) U.S. Cl. ................. 428/402; 252/70; 106/2; 106/13

(58) Field of Classification Search .................. 428/402; 252/70; 106/2, 13
See application file for complete search history.

(56) References Cited

U.S. PATENT DOCUMENTS 4,430,240 A * 2/1984 Sandvig et al. ................. 252/70

FOREIGN PATENT DOCUMENTS

| EP | 1958998 A1 | 8/2008 |
| FR | 2546039 A1 | 11/1984 |
| JP | 51-109290 | 9/1976 |
| SE | 9404184 A | 6/1996 |
| WO | WO-02076192 A2 | 10/2002 |

OTHER PUBLICATIONS

European Search Report for EP-1958998-A1 (application No. 07 00 3131), issued Jul. 4, 2007.

* cited by examiner

*Primary Examiner* — Leszek Kiliman
(74) *Attorney, Agent, or Firm* — Georg Hasselmann; Ottesen P.A.

(57) ABSTRACT

The present invention relates to a method for the preparation of a granulate consisting of wood particles comprising 1 to 10% by weight with at least one water-soluble salt of an alkali metal or alkaline-earth metal.

20 Claims, No Drawings

METHOD FOR THE PREPARATION OF A GRANULATE FOR THE TREATMENT OF SNOW-COVERED AND/OR ICY SURFACES

CROSS REFERENCE TO RELATED APPLICATIONS

This nonprovisional application claims priority under 35 U.S.C. §119(a) to Patent Application No. 2655900 filed in Canada on Mar. 3, 2009, the entire contents of which are hereby incorporated by reference.

The present invention relates to a method for the preparation of a novel wood granulate for the treatment of snow-covered and/or icy surfaces within the scope of winter maintenance as well as a granulate that can be obtained by the method.

Maintenance of the road network in winter demands quite particular attention. All of the known methods and procedures aim to maintain or restore the safe movement of persons and goods over the entire road network during winter and are designated more generally by the expression "winter viability".

The requirements of snow clearance and de-icing define the quality of maintenance of the network. The materials used for winter maintenance of highways in the prior art are principally melting agents (sodium chloride and other salts) and abrasives (grit, sand). Melting agents have the objective of removing the snow or ice by converting it to water. As the melting action is affected by the temperature, the temperature of the road surface determines the type of melting agent to be used. At temperatures below −15° C., most melting agents prove ineffective and at these low temperatures abrasives are used on all the types of highways.

It should be noted that the melting action is promoted by the passage of vehicles. The heat and moisture produced by the friction of the tyres on the road surface trigger melting of the salt and stimulate its action on the ice. Basically, with increased flow of traffic, the action of the salt is more able to achieve the requirements of rapid de-icing.

As described above, in the prior art two principal materials are used for winter maintenance of highways, notably sodium chloride (salt) and abrasives. The abrasive is a sifted sand or crushed granulate mixed with 5% of sodium chloride, which prevents the sand freezing in lumps and becoming difficult to handle. The abrasive is used for improving tyre adhesion, especially on bends and at danger points (intersections, railway crossings).

The melting action is also affected by the temperature. However, a small amount of salt or calcium chloride is added to the abrasive to enable it to adhere to hardened snow and/or ice. However, apart from periods of extreme cold, even this strategy is rather ineffective. Water and heat are necessary to dissolve the salt and make it fully effective.

Other products, such as calcium chloride in flakes or in liquid form as well as Calso, are also used for increasing the effectiveness of the two principal materials.

Calso is a mixture of 43% calcium chloride, 41% sodium chloride and 15% magnesium chloride. Calso is added at 4% to sand or crushed granulate to make the abrasives, instead of 5% of salt. This product contains wet abrasive.

An important novelty is the use of moistened salt. This technique consists of moistening the salt with a brine, i.e. a solution of calcium chloride at 28%. The moistened salt is used in particular on highways where the traffic flow is greatest.

However, the materials used have drawbacks.

The salts used for clearing ice, in particular sodium chloride, are harmful to plants growing alongside highways and pedestrianized zones.

The disadvantage of abrasives is—aside from the fact that they contain sodium chloride—that after the snow has melted they remain in place and the highways must be cleaned to prevent pollution with a fine dust.

Therefore the object of the present invention is to provide a novel granulate for the treatment of snow-covered and/or icy surfaces, which avoid the drawbacks of the materials used until now, and in particular to provide an environment-friendly product that can be recycled and used for other purposes.

This problem is solved by a method for the preparation of a granulate according to the invention.

This method comprises the following stages:
a) Providing a granulate consisting of wood particles;
b) Preparation of a brine containing at least one soluble salt of an alkali metal or alkaline-earth metal where the water-soluble salts are preferably chlorides, nitrates and sulphates and acetates of alkali metals or alkaline-earth metals;
c) Impregnation of the granulate in the brine;
d) Drying of the granulate thus obtained.

The wood can be any hardwood in the form of chips or granules, for example oak, beech etc. Alternatively, softwood, for example fir, spruce, birch, maple, can also be used within the scope of the present invention. Softwood offers the advantage that the drying stage is carried out at lower temperatures than with hardwood, therefore the granulate thus obtained have higher moisture content than the products obtained based on the hardwood.

The particles are obtained by grinding or chipping, then double sieving in order to obtain the desired particle size.

The diameter of the particles is preferably in the range from 3 to 20 mm.

Obviously, in other embodiments it is also possible to use a mixture of several salts and/or prepare a composition of salts of the same metal.

The salts that are preferred for use in the method according to the invention include magnesium chloride, calcium chloride and sodium chloride or mixtures of these salts.

Preferably, magnesium chloride is used, which has a very low pH, and therefore is not very aggressive with respect to concrete structures, the environment and animals, for example compared with sodium chloride.

The concentration of the salt in the brine is preferably from 10 to 20%. A higher concentration is possible but is avoided, as it leads to higher costs relative to the preferred concentration.

It was found that even a concentration of 10-20% is sufficient to obtain a granulate displaying the advantageous effects described above.

The impregnation stage is preferably carried out at ambient temperature. Either the wood particles (the chips) are soaked in the brine for 1 to 5 days, preferably at ambient temperature. Or the chips are impregnated for example by spraying by means of devices and methods that are essentially known in the prior art.

In other embodiments, gentle heating of the brine can be envisaged during the impregnation stage in order to obtain better adsorption of the salt into the wood.

The drying stage is carried out for 1 to 5 hours, preferably between 3 and 5 hours, in the open air or with a supply of heat at a temperature in the range from 100° C. to 200° C., preferably from 130° C. to 140° C. It should be noted that the drying time also depends on the type of wood, as certain kinds of wood, for example oak, can withstand higher temperatures than for example beech etc.

The optional roasting of the dried product is carried out with suitable equipment (oven, heating plate, roaster) between 180° C. and 250° C. until a slightly darkened, hard surface is obtained.

However, roasting of the granulates obtained is less advantageous. In one embodiment, it is preferable to keep the granulate slightly moist, which improves the melting action relative to a roasted granulate. The onset of de-icing is 10% faster for a moist granulate relative to a roasted granulate. Therefore, in a more preferred embodiment, the roasting stage can be omitted.

The problem of the present invention is also resolved with a granulate that can be obtained by the method of the present invention for the treatment of snow-covered and/or icy surfaces consisting of wood particles comprising 1 to 10 wt. %, preferably 1 to 5 wt. %, of at least one water-soluble salt of an alkali metal or alkaline-earth metal, the water-soluble salts preferably being chlorides, nitrates and sulphates and acetates of alkali metals or alkaline-earth metals. The most preferred metals are sodium, potassium, magnesium and calcium.

The presence of the salt of alkali metal or alkaline-earth metal has the effect that the granulate, in contact with a surface covered with snow or ice, cause the latter to melt. The granulate then partially become embedded in the substrate.

This granulate offers the advantage that it is an environment-friendly product and, because of its density, which is lower relative to the granulate used in the prior art, it always remains on the surface, which leads to improvement of the adhesion of the treated surface and in particular prolonged adhesion.

The granulate according to the invention is softer than the mineral granulates normally used, which avoids damage in residential premises when the particles adhere to footwear. It is also less aggressive on the paws of animals walking on the granulate.

Moreover, the granulate offers the advantage of natural disposal, by the network of drains and treatment in a water treatment works or by brushing and/or incineration.

The product obtained by the method according to the invention, i.e. the product according to the invention, is intended to improve the adhesion of snow-covered and/or icy surfaces within the scope of winter maintenance of highways and footways. It can be applied to any surface carrying traffic, for example highways, footways, pedestrianized zones.

In general, the product is used at a rate of 20 to 100 g/m$^2$ and is spread by hand or by machine.

As already described above, after the snow has melted the product according to the present invention can be eliminated naturally by the network of drains or by brushing and incineration.

The invention claimed is:

1. Method for the preparation of a granulate for the treatment of snow-covered and/or icy surfaces comprising the following stages:
   a) Providing a granulate consisting of wood particles;
   b) Preparation of a brine containing at least one water-soluble salt of an alkali metal or alkaline-earth metal the soluble salt of which is a chloride, nitrate, sulphate or acetate of an alkali metal or alkaline-earth metal;
   c) Impregnation of the granulate with the brine;
   d) Drying of the granulate.

2. Method according to claim 1, wherein the salt is selected from the group consisting of $MgCl_2$, $CaCl_2$, NaCl and mixtures thereof.

3. Method according to claim 2, wherein the concentration of salt in the brine is in the range from 10 to 20%.

4. Method according to claim 3, wherein impregnation is carried out at ambient temperature.

5. Method according to claim 4, wherein drying is carried out in the open air or with a supply of heat.

6. Granules for the treatment of snow-covered and/or icy surfaces that can be obtained by a method according to claim 1 consisting of wood particles comprising 1 to 10 wt. % of at least one water-soluble salt of an alkali metal or alkaline-earth metal, where the soluble salt is a chloride, nitrate, sulphate or acetate of an alkali metal or alkaline-earth metal.

7. Granules according to claim 6, wherein the diameter of the granulate is between 3 and 20 mm.

8. Granules according to claim 7, wherein the metals are selected from the group consisting of Na, K, Mg, Ca and mixtures thereof.

9. Granules according to claim 7, wherein several salts are present in the granulate.

10. Granules for the treatment of snow-covered and/or icy surfaces that can be obtained by a method according to claim 2 consisting of wood particles comprising 1 to 10 wt. % of at least one water-soluble salt of an alkali metal or alkaline-earth metal, where the soluble salt is a chloride, nitrate, sulphate or acetate of an alkali metal or alkaline-earth metal.

11. Granules for the treatment of snow-covered and/or icy surfaces that can be obtained by a method according to claim 3 consisting of wood particles comprising 1 to 10 wt. % of at least one water-soluble salt of an alkali metal or alkaline-earth metal, where the soluble salt is a chloride, nitrate, sulphate or acetate of an alkali metal or alkaline-earth metal.

12. Granules for the treatment of snow-covered and/or icy surfaces that can be obtained by a method according to claim 4 consisting of wood particles comprising 1 to 10 wt. % of at least one water-soluble salt of an alkali metal or alkaline-earth metal, where the soluble salt is a chloride, nitrate, sulphate or acetate of an alkali metal or alkaline-earth metal.

13. Granules for the treatment of snow-covered and/or icy surfaces that can be obtained by a method according to claim 5 consisting of wood particles comprising 1 to 10 wt. % of at least one water-soluble salt of an alkali metal or alkaline-earth metal, where the soluble salt is a chloride, nitrate, sulphate or acetate of an alkali metal or alkaline-earth metal.

14. Granules according to claim 8, wherein several salts are present in the granulate.

15. Granules according to claim 10, wherein the diameter of the granulate is between 3 and 20 mm.

16. Granules according to claim 11, wherein the diameter of the granulate is between 3 and 20 mm.

17. Granules according to claim 12, wherein the diameter of the granulate is between 3 and 20 mm.

18. Granules according to claim 13, wherein the diameter of the granulate is between 3 and 20 mm.

19. Granules according to claim 10, wherein several salts are present in the granulate.

20. Granules according to claim 11, wherein several salts are present in the granulate.

* * * * *